United States Patent Office 3,115,923
Patented Dec. 31, 1963

3,115,923
FUEL CONTROL SYSTEMS FOR INTERNAL COMBUSTION ENGINES
Michael Kellner, London, and Peter Bruno Kahn, Loughton, England, assignors to The Plessey Company Limited, London, England, a British company
Filed Nov. 21, 1960, Ser. No. 70,857
Claims priority, application Great Britain Nov. 26, 1959
2 Claims. (Cl. 158—36.4)

This invention relates to the control of the fuel supply for an internal combustion turbine and has for an object to provide an improved control device for controlling the supply of fuel during the initial acceleration of such turbine, to its normal running speed.

It has been found in practice that generally the permissible maximum fuel flow, after rising substantially proportionately to the turbine speed at a relative low rate up to a certain speed which generally lies between one quarter and three quarters of the maximum speed, then rises steeply over a short subsequent range, whereafter the gradient of rise assumes a further substantially constant value lying between the original low value and the subsequent steep value, and it is a more specific object of the present invention to provide an arrangement permitting to provide a fuel flow characteristic of this nature.

The invention provides an arrangement comprising a fixed-displacement pump driven by the turbine which, acting alone, would yield a fuel flow directly proportional to turbine speed, in combination with two dump outlet paths, each controlled by a preferably adjustable metering orifice, and with a flow-responsive valve which up to a predetermined first rate of flow from the pump permits escape through both metering orifices and then, up to a predetermined higher rate of flow, progressively cuts off the escape path through one of the metering orifices while leaving the fuel-escape path through the other metering orifice unaffected.

Preferably the flow-responsive valve is interposed between pump delivery and the two metering orifices.

In the drawing accompanying the specification:

Figure 1:
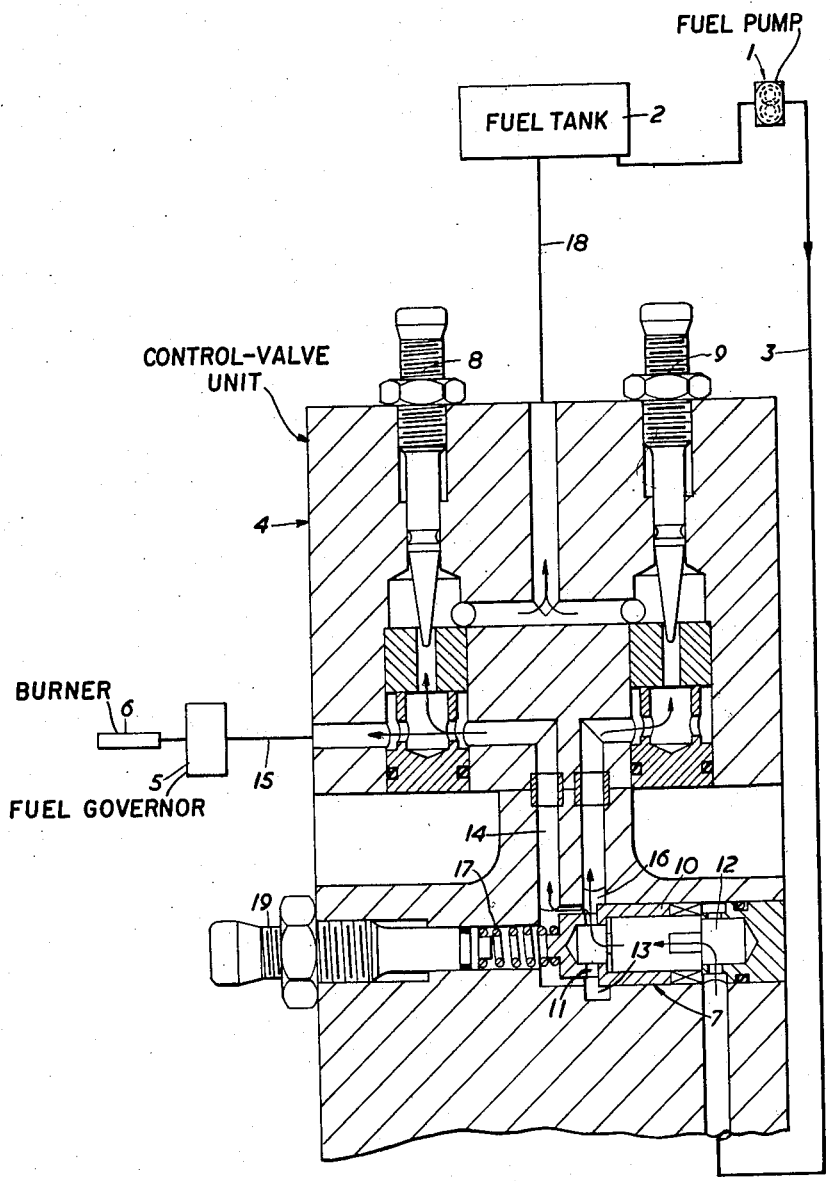
FIGURE 1 is a sectional elevation of a valve device and shows the main control elements of the apparatus according to the invention, some further elements being diagrammatically indicated to provide a flow diagram of the fuel-supply system.

Referring now first to FIGURE 1, the system comprises a volumetric fuel pump represented as a gear pump 1, which draws fuel from a tank 2 and delivers it through a pump-delivery line portion 3, a control-valve unit 4, and a further line portion 15 including a fuel governor 5 constituting a speed-control device, to the engine burner unit 6. The valve assembly 4 constitutes the acceleration control unit and comprises a flow-controlled stop valve 7 and two needle valves 8 and 9. The stop valve 7 comprises a piston 10 which separates, except for apertures 11 which constitute a speed-metering restriction, an inlet chamber 12 connected to the pump delivery line 3 from an outlet chamber 13. The latter has a permanently open connection to a spill line 14 leading past a spill-metering restriction formed by a needle valve 8 to line portion 15 and thus, through the fuel governor 5, to the burner unit 6. In addition the chamber 13 is provided with a connection to a second spill line 16 which includes a spill-metering restriction formed by the other needle valve 9. The inlet to this line 16 is controlled by the stop-valve piston 10. A spring 17 tends to hold the piston 10 in the illustrated position, in which spill line 16 is open. When fuel is delivered by the pump 1, the pressure drop in the speed-metering restriction 11 produces a force which varies according to the rate of flow of the fuel delivered by pump 1 to line 3, and which tends to move the piston against the force of the spring 17 to a position in which it closes port 16. Needle valves 8 and 9 provide adjustable spill-metering restrictions for the spill lines 14 and 16 both of which lead back to the tank 2 by a common return line 18.

Figure 2:
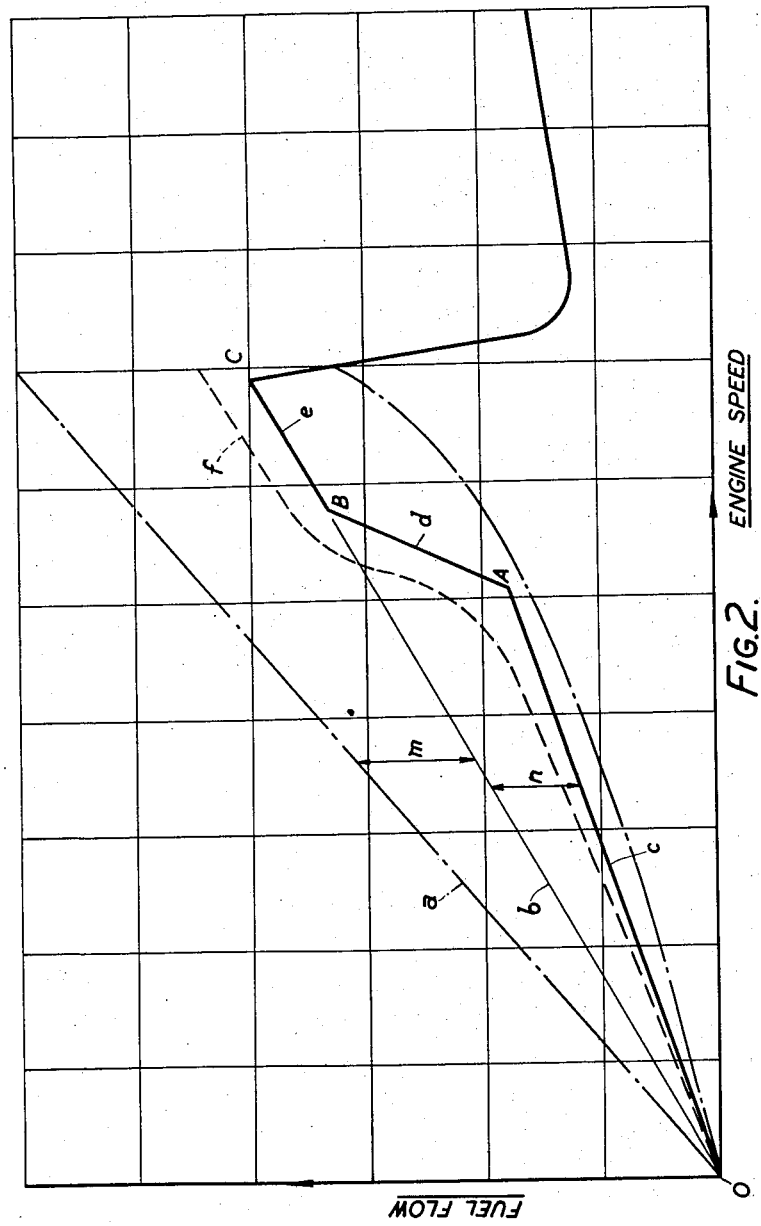
FIGURE 2 is a graph showing various flow rates as a function of the engine speed.

FIGURE 2 is a graph illustrating the operation. The chain-dotted line $a$ represents the output of the fuel pump 1 as a function of the turbine speed; it will be seen that this is a linear characteristic giving a delivery proportional to turbine speed. A second line $b$ is obtained by deducting from each value of the line $a$ the amount $m$ which, in view of the resulting pressure build-up in the burner 6, will at the engine speed in question be spilled through the permanently accessible spill line 14, which includes the needle valve 8, while line $c$, extending between points O and A is similarly obtained by deducting from line $b$ at each point the amount $n$ which under the same conditions is spilled through line 16, which contains the needle valve 9 when the port controlling its inlet is open. When point A is reached, the rate of flow is such that the flow-valve piston 10 overcomes the pressure of the spring 17 so that, as the turbine speed further increases, the flow valve 7 will progressively close the port leading to spill line 16 until at point B this port is entirely closed. It follows that while between points O and A the flow in fuel delivery-line portion 15 is represented by graph line $c$, this flow then rises steeply as shown by line $d$ up to a point B, and finally from point B up to a point C at which the greater part of flow is assumed to be progressively spilled by the speed-responsive fuel governor 5, the flow to burner unit 6 corresponds to graph line $e$, as shown by the heavy line in the diagram. The diagram further shows a broken line $f$ which represents the permissible fuel flow to the turbine as determined by the risk of overheating, and it will be appreciated that by suitably adjusting the apertures of the two needle valves 8 and 9 and, by means of a set screw 19, the loading of the spring 17, in combination with a suitable choice of spring, it is possible to cause the fuel delivery curve O, A, B, C, to approximate closely the curve $f$ of permissible flow. In practive the system will be supplemented by various safety devices and other control means such as an over-speed trip, an excess-pressure relief valve and others which do not affect the operation of the present invention under normal starting conditions, and which therefore have not been described in the specification or shown in the drawing.

What we claim is:

1. In the fuel system of a combustion turbine having a fuel burner unit, the combination comprising a volumetric fuel pump driven by the turbine and having an outlet for fuel under pressure, a fuel delivery line leading from said outlet to the burner unit, a first spill line leading from a branching point of the fuel delivery line to a low pressure point and including a first spill-metering restriction, the delivery line including, between the pump and said branching point, a speed-metering restriction producing a pressure drop in accordance with the rate of fuel flow from the pump outlet, a stop valve in the first spill line in series with the first spill-metering restriction, a second spill line leading from a branching point in the fuel-delivery line between the speed-metering restriction and the burner unit to the low-pressure point, said second spill line including a second spill-metering restriction, and means responsive to the pressure drop in the speed-metering restriction and operative to cause the stop valve to be open when the pressure drop in the speed-metering restriction is below a first value, to be partly open in accordance with the additional pressure drop in the speed-metering restriction when the said pressure drop is between said first value and a higher second value, and to be closed when the said pressure drop exceeds said second value.

2. A fuel system as claimed in claim 1, further including a fuel governor interposed in the fuel delivery line portion between said branching points and the burner unit.

References Cited in the file of this patent
FOREIGN PATENTS

| | | |
|---|---|---|
| 753,831 | Germany | Aug. 23, 1954 |
| 762,194 | Great Britain | Nov. 28, 1956 |